(12) United States Patent
Dhoble et al.

(10) Patent No.: US 11,427,719 B2
(45) Date of Patent: Aug. 30, 2022

(54) METHODS FOR THE PRINTING OF MATERIALS USING HYBRID INK FORMULATIONS (71) Applicant: Kornit Digital Ltd., Rosh HaAyin (IL)

(72) Inventors: Avin Dhoble, Waltham, MA (US); Travis Alexander Busbee, Somerville, MA (US)

(73) Assignee: Kornit Digital Ltd., Rosh HaAyin (IL)

( * ) Notice: Subject to any disclaimer, the term of this patent is extended or adjusted under 35 U.S.C. 154(b) by 0 days.

(21) Appl. No.: 16/294,657

(22) Filed: Mar. 6, 2019

(65) Prior Publication Data
US 2019/0276689 A1 Sep. 12, 2019

Related U.S. Application Data (60) Provisional application No. 62/639,250, filed on Mar. 6, 2018.

(51) Int. Cl.
*C09D 11/101* (2014.01)
*C09D 11/36* (2014.01)
(Continued)

(52) U.S. Cl.
CPC ......... *C09D 11/101* (2013.01); *B41M 7/0081* (2013.01); *C09D 11/36* (2013.01); *C09D 11/38* (2013.01)

(58) Field of Classification Search
CPC ....... C09D 11/101; C09D 11/36; C09D 11/38; C09D 11/102; C09D 11/40; C09D 11/30; C09D 11/32; C09D 11/322; C09D 11/324; C09D 11/328; C09D 11/005; C09D 11/54; C09D 11/52; C09D 11/106; C09D 11/107; B41M 7/0081; B41M 5/0011; B41M 5/0017; B41M 5/0023; B41M 5/0047; B41M 7/00; B41M 7/0072; B41M 5/52; B41M 5/5218; B41M 5/5227; B41J 11/002; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 2/04581; B41J 2/055; B41J 2/16538;
(Continued)

(56) References Cited

U.S. PATENT DOCUMENTS

2005/0171237 A1\* 8/2005 Patel ...................... C09D 11/36
523/160
2012/0042518 A1 2/2012 Law et al.
(Continued)

FOREIGN PATENT DOCUMENTS

WO WO 2019/173511 9/2019

OTHER PUBLICATIONS

International Preliminary Report on Patentability dated Sep. 17, 2020 From the International Bureau of WIPO Re. Application No. PCT/US2019/021009. (8 Pages).
(Continued)

*Primary Examiner* — Manish S Shah (57) ABSTRACT

Methods relating to the printing of materials using hybrid ink formulations are generally described.

5 Claims, 2 Drawing Sheets

(51) Int. Cl.
  *B41M 7/00* (2006.01)
  *C09D 11/38* (2014.01)
(58) Field of Classification Search
  CPC .............. B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41J 2/04588; B41J 2/04595; B41J 2/04586; B41J 2/14274; B41J 3/4078; B41J 11/06; D06P 1/0032; D06P 1/0096; D06P 5/001; D06P 5/02; D06P 5/2011; D06P 5/2077; D06P 5/2083; D06P 5/30; Y10T 428/24802
  See application file for complete search history.

(56) References Cited

U.S. PATENT DOCUMENTS

2017/0321083 A1* 11/2017 Fenn ...................... C09D 11/30
2019/0039310 A1    2/2019 Busbee et al.

OTHER PUBLICATIONS

International Search Report and Written Opinion for International App. No. PCT/US2019/021009 dated Apr. 30, 2019.

* cited by examiner

METHODS FOR THE PRINTING OF MATERIALS USING HYBRID INK FORMULATIONS

RELATED APPLICATIONS

This application claims priority under 35 U.S.C. § 119(e) to U.S. Provisional Application No. 62/639,250, filed Mar. 6, 2018, and entitled "Methods for the Printing of Materials Using Hybrid Ink Formulations," which is incorporated herein by reference in its entirety for all purposes.

TECHNICAL FIELD

Methods relating to the printing of materials using hybrid ink formulations are generally described.

BACKGROUND

In some cases related to printing materials, it is desirable for a material to have a low viscosity up until it is deposited onto a substrate. When the material is deposited onto the substrate, it is desirable for the viscosity of the material to increase significantly such that the material may hold its shape and be prevented from sinking all the way into a substrate, such as a porous fabric. The viscosity of a material can be increased by the addition of rheological modifiers (e.g., fumed silica, fillers, liquid rheological modifiers). These solutions, however, require extensive mixing to achieve the desired effect, and must be carried out in advance of the printing and pumping process. Since these rheological modifications must be done in advance, the material has a high viscosity prior to packaging and loading into the deposition systems. This complicates the process of removing trapped air from the materials, and also makes it difficult to pump the material long distances from supply containers to the print heads themselves. Accordingly, improvements are needed.

SUMMARY

Methods relating to the printing of materials using hybrid ink formulations are generally described. The subject matter of the present invention involves, in some cases, interrelated products, alternative solutions to a particular problem, and/or a plurality of different uses of one or more systems and/or articles.

According to certain embodiments, a method is described, wherein the method comprises passing a formulation through a print head, depositing the formulation on a substrate, and at least partially curing at least a portion of the formulation using UV irradiation as the formulation exits the print head. According to some embodiments, the formulation comprises a first component comprising one or more molecules with one or more isocyanate functional groups and a second component comprising one or more molecules with one or more alcohol functional groups and/or one or more molecules with one or more amine functional groups.

In some embodiments, a composition is described, wherein the composition comprises a first component comprising one or more molecules with one or more isocyanate functional groups, and a second component comprising one or more molecules with one or more alcohol functional groups and/or one or more molecules with one or more amine functional groups. In certain embodiments, the composition is a liquid ink and/or thixotropic ink.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Methods relating to the printing of materials using hybrid ink formulations are generally described. In certain embodiments, the hybrid ink formulation (e.g., a thixotropic ink formulation, a liquid ink formulation) enables digital manufacturing, such as depositing material onto a substrate (e.g., depositing ink onto the fabric of a shoe).

In some embodiments, the hybrid ink formulation comprises a first component and a second component that differ in composition, and when mixed in the appropriate ratios can provide formulations with targeted properties at any given location on a substrate. For example, in certain embodiments, the hybrid ink formulation comprises a first component comprising one or more molecules with one or more isocyanate functional groups and a second component comprising one or more molecules with one or more alcohol functional groups and/or one or more molecules with one or more amine functional groups (e.g., amines). For example, in some embodiments, the second component comprises a polyol. According to certain embodiments, the properties of the molecules chosen for both the first component and the second component have direct implications on the mechanical properties of the hybrid ink formulation, such as the percent elongation at break, strength, and stiffness.

In some embodiments, multiple components of an ink formulation are reacted (e.g., with a catalyst) at room temperature, followed by hot oven exposure to increase productivity and 100% cure completion to attain the maximum potential for the mechanical properties of the ink formulation. In certain cases, multiple components of an ink formulation are chosen to facilitate a fast cure response after mixing, and to allow for a sufficient processing window such that the cure response is initiated upon exiting the mixing chamber, therefore avoiding clogs within the mixing chamber. The fast cure response after mixing results in an ink formulation that is viscous and not easily handled immediately after it is deposited on a substrate. Depending on the ink formulation, the viscous phase lasts for one minute to five minutes after the formulation is deposited on a substrate. In a production scenario, this time period is critical to the overall productivity of the process.

According to certain embodiments, the first component and the second component of the ink formulation are reacted together (e.g., in a mixing chamber) to form the hybrid ink formulation. In some embodiments, upon depositing onto a substrate, the viscous time period is shortened by utilizing a partial UV cure of the material system. In certain embodiments, this is done by incorporating materials into the hybrid ink formulation that undergo curing when exposed to UV irradiation of a certain frequency, and exposing the material that is exiting the mixing chamber with a UV source of the required frequency. According to some embodiments, the light-curable material is exposed to light (e.g., UV light) of an appropriate curing wavelength upon the material exiting a printing nozzle, or after a predetermined delay between exiting the printing nozzle and light exposure. The exposure to UV irradiation may increase the viscosity of the resulting material very rapidly to the consistency of a non-flowing paste (e.g., thixotropic paste), resin, or gel that can withstand forces from the compressed gas without deformation. This rapid increase in viscosity may also prevent the deposited material from soaking into porous fabrics, and may enable structures of substantial thickness to be built up. Other benefits include the ability of the ink formulation, once deposited on a substrate, to retain its shape as it is being deposited. This facilitates creating structures (e.g. overlapping threads or filaments).

In certain embodiments, the hybrid ink formulation comprises a first component comprising one or more molecules with one or more isocyanate functional groups. According to some embodiments, the first component comprising one or more molecules with one or more isocyanate functional groups can be either an aliphatic or aromatic monomer or a prepolymer based on said monomer. In certain embodiments, the prepolymer is a partially reacted isocyanate where a fixed portion of the starting monomer can controllably be reacted with a selected polyol (e.g., a diol, a triol, etc.) and the remaining portion of the starting monomer (e.g., available reactive sites) is available for further reactivity. In some embodiments, the use of a prepolymer is advantageous because it includes more control on reactivity rates, less health and environmental hazards, and the opportunity to have the majority of properties already incorporated in the starting material that can then be further enhanced by the choice of polyols that are reacted with the prepolymer.

According to certain embodiments, the prepolymer comprises an unreacted portion of available reaction sites. In some embodiments, one cyanate group (—N═C═O) group of the isocyanate can react with one hydroxyl group (—OH) of one or more polyols. The number of unreacted NCO groups per isocyanate or prepolymer can be calculated by determining the % NCO, which represents the weight percent of an isocyanate or prepolymer comprising cyanate groups, or the percent of unreacted cyanate groups that are available for reactivity.

In some cases, most commercially available prepolymers are developed with a specific set of target properties and applications, and some prepolymers are relatively limited in range in which the reactive properties can be tuned. In some embodiments, the % NCO is an indication of potential reactive groups, as well as potential for reactive properties for any given prepolymer. For example, when an isocyanate is reacted with a given polyol or chain extender, a higher % NCO prepolymer will generally have a higher speed of reaction and higher stiffness.

According to certain embodiments, the collective % NCO of the prepolymer blend is in the range of 15% to 25%, more preferably in the range of 19% to 22%, more preferably in the range of 14% to 19%, more preferably in the range of 15% to 18%, and more preferably in the range of 16% to 17%.

According to certain embodiments, the first component comprises more than one (e.g., two, three, four, five) molecules containing at least one isocyanate functional group. For example, the first component may comprise one or more of methylene diphenyl diisocyanate (MDI), 1,6-hexamethylene diisocyanate, 1-isocyanato-3-isocyanatomethyl-3,5,5-tyimethyl cyclohexane, and/or 4,4'-diisocyanato dicyclohexylmethane.

In certain embodiments, the first component comprises MDI prepolymer made with polyether polyols. In some embodiments, the MDI prepolymers has any of a variety of suitable % NCO values. According to certain embodiments, for example, the first component comprises MDI prepolymer with a % NCO of greater than 15% and less than or equal to 25%. In some embodiments, the first component comprises MDI prepolymer based on polyether polyol with a % NCO of greater than 19%, MDI prepolymer based on polytetramethylene ether glycol diol with a % NCO of less than 11%, and/or MDI prepolymer based on polytetramethylene ether glycol diol with a % NCO of greater than 16%.

According to certain embodiments the first component comprises one or more molecules with one or more isocyanate functional groups in any of a variety of suitable amounts. For example, in some embodiments, the first component comprises one or more molecules with one or more isocyanate functional groups in an amount of 1-90 wt. % versus the total weight of the first component.

In certain embodiments, the first component comprises MDI prepolymer based on polyether polyol with a % NCO of greater than 19% in an amount of 30-90 wt. % versus the total weight of the first component. According to some embodiments, the first component comprises 0-55 wt. % MDI prepolymer based on polytetramethylene ether glycol diol with a % NCO of less than 11%. In certain embodiments, the first component comprises 2-15 wt. % MDI prepolymer based on polytetramethylene ether glycol diol with a % NCO of greater than 16%.

According to certain embodiments, the first component of the hybrid ink formulation comprises a rheology additive and/or filler. In certain embodiments, the rheology additive and/or filler comprises fumed silica, spherical silica, amide wax, glass beads (e.g., reflective glass beads), and/or thermoplastic microspheres (e.g., Expancel microspheres provided by AkzoNovbel). According to some embodiments, the rheology additive is optional. The first component may comprise the rheology additive in any of a variety of suitable amounts. For example, the first component may comprise the rheology additive in 0-10 wt. % versus the total weight of the first component.

According to certain embodiments the hybrid ink formulation comprises the first component in any of a variety of suitable amounts. For example, the hybrid ink formulation may comprise 30-75 wt. % of the first component versus the total weight of the ink formulation.

In some cases, a performance requirement for hybrid ink formulations is their ability to withstand flexing motions on a substrate under extreme cold conditions (e.g., −10° C. to −20° C.). The ability to flex under cold temperatures without cracking becomes progressively more challenged with increasing stiffness. This requires a combination of good strength and low glass transition temperature (Tg) (e.g., Tg less than −20° C.). For example, in certain cases, some polyols (e.g., polyester) have low Tg and good strength, but poor hydrolysis resistance. Other polyls (e.g., polytetramethylene ether glycol diol) have low Tg, good hydrolysis resistance, but a poor stiffness range. Some polyol chemicals (e.g., polycaprolactone) have a better balance of the aforementioned properties, but are not best in class for any particular property, and in some cases, no one polyol chemistry provides a good solution to meet all performance requirements.

According to some embodiments, the % NCO of the isocyanate has a significant impact on cold flex performance. In certain embodiments, a % NCO in the 16-17% range is the optimum level to achieve good cold flex performance while maintaining much of the broad property range achievable. At a % NCO below the range of 16-17%, the formulation provides superior cold flex performance, but shortens the property range achievable. Conversely, in certain embodiments, at a % NCO above the range of 16-17%, the property range broadens at the expense of cold flex performance. Another factor that is equally important from standpoint of balancing cold flex performance with ability to achieve overall broad property range is the polyol composition that is reacted with the isocyanate (at the % NCO range of 16-17%).

According to some embodiments, the hybrid ink formulation comprises a second component comprising one or more molecules with one or more alcohol functional groups and/or one or more molecules one or more amine functional groups. In certain embodiments, the second component is a mixture of more than one molecule with at least one type of alcohol functional group and/or more than one molecule with at least one amine functional group (e.g., amines).

For example, according to certain embodiments, the second component comprises one or more polyols (e.g., polytetramethylene ether glycol, polycarbonate, polycaprolactone, polypropylene glycol, butyl ether propanediol, and/or polyester based polyols). According to certain embodiments, the polyols react with isocyanate to form polyurethane linkages. In certain embodiments, the second component comprises Oxymer™ M112 provided by Perstrop.

According to certain embodiments, the second component may comprise one or more polyols with certain molecular weights. In some embodiments, for example, the second component may comprise one or more polyols with a molecular weight in the range of 250 g/mol to 3000 g/mol, more preferably a molecular weight in the range of 500 g/mol to 1500 g/mol, more preferably a molecular weight in the range of 650 g/mol to 1000 g/mol. For example, in certain embodiments, the second component may comprise polytetramethylene ether glycol with a molecular weight of greater than or equal to 650 g/mol and less than or equal to 1000 g/mol. In some embodiments, the second component may comprise polycarbonate with a molecular weight of greater than or equal to 500 g/mol and less than or equal to 2000 g/mol, more specifically a molecular weight of greater than or equal to 750 g/mol and less than or equal to 1250 g/mol. In some embodiments, the second component comprises butyl ether propanediol with a molecular weight of greater than or equal to 750 g/mol and less than or equal to 1250 g/mol. In certain embodiments, the second component may comprise polypropylene glycol based polyether diol with a molecular weight of greater than or equal to 500 g/mol. In some embodiments, the second component may comprise polypropylene glycol based polyether triol with a molecular weight of greater than or equal to 1000 g/mol.

According to certain embodiments incorporation of one or more polyols into ink formulations provides excellent resiliency and dynamic performance that is critical for ink applications (e.g., incorporation into footwear).

In certain embodiments, the second component comprises molecules with aliphatic amine functional groups (e.g., JEFFAMINE D-400 polyetheramine and/or JEFFAMAINE D-230 polyetheramine). In certain embodiments JEFFAMINE D-400 polyetheramine reacts with isocyanate reactive sites to create polyurea linkages. The presence of polyurea linkages dispersed within the polyurethane matrix structure breaks the regularity of hard segments and at least partially impedes the formation of crystallization zones within the polyurethane structure, and to an extent mitigates the brittleness caused at low temperature conditions.

According to certain embodiments, the second component comprises one or more molecules with one or more of an alcohol functional groups and one or more molecules with one or more amine functional groups to form both polyurea and polyurethane linkages upon reacting with isocyanates.

In some embodiments the second component comprises at least one molecule with one or more alcohol functional groups and/or at least one molecule with one or more amine functional groups in any suitable amount. For example, the second component may comprise at least one molecule with one or more alcohol functional groups and/or at least one molecule with one or more amine functional groups in an amount of 1-70 wt. % versus the total weight of the second component.

According to certain embodiments, the second component comprises polytetramethylene ether glycol with a molecular weight of greater than or equal to 650 g/mol in an amount of 0-40 wt. % versus the total weight of the second component. In certain embodiments, the second component comprises polycarbonate with a molecular weight of greater than or equal to 500 g/mol in an amount of 30-60 wt. % versus the total weight of the second component. In some embodiments, the second component comprises polypropylene glycol based polyether diol with a molecular weight of greater than 500 g/mol in an amount of 50-70 wt. % versus the total weight of the second component. In some embodiments, the second component comprises polypropylene glycol based polyether triol with a molecular weight of greater than 1000 g/mol in an amount of 10-30 wt. % versus the total weight of the second component. According to some embodiments, the second component comprises polyetheramine in an amount of 0-7 wt. % versus the total weight of the second component.

According to certain embodiments, the ink formulation comprising the first component and the second component can be cured/cross-linked under exposure to UV irradiation. In certain embodiments, the portion of the hybrid ink formulation that is cured by UV is cured as it is deposited onto the substrate (e.g., from the print head and/or printing nozzle). The mass percentage of molecules that contain UV-curable functionality may be as high as 100% for any individual input. The mass percentage of molecules that contain UV-curable functionality may be as high as 60% for the final mixture in the case that molecules containing UV-curable functional groups are present on different molecules from the molecules containing one or more functional groups curable by means other than UV exposure (e.g., isocyanates, alcohols, or amines). In the case where UV-curable functional groups are present on the same molecules that also contain one or more functional groups curable by means other than UV exposure (e.g., isocyanates, alcohols, or amines), as much as 100% of the molecules may contain at least one UV-curable functional group. The UV-curing process is described in more detail herein.

In certain embodiments, the second component comprises a UV cure package. According to certain embodiments, the UV cure package comprises acrylates, alkenes, and/or thiols in combination with a free radical photoinitiator (e.g., Sartomer CN 965+2.7% Speedcure XKM initiator). In certain embodiments, the acrylate is urerthane acrylate. In some embodiments, the alkene is an alkene functional resin. According to certain embodiments, the thiol is a thiol functional resin. In some embodiments, the free radical photoinitiator initiates the reaction of an acrylate with other acrylate(s). Example of free radical photoinitiators include, in some cases, diphenyl(2,4,6-trimethylbenzoyl)phosphine oxide, phenylbis(2,4,6-trimethylbenzoyl)phosphine oxide, and/or ethyl (2,4,6-trimethylbenzoyl) phenylphosphinate The second component may comprises the UV care package in any of a variety of suitable amounts. For example, in some embodiments, the second component comprises the UV care package in an amount of 5-20 wt. %, preferably 7-17 wt. %, more preferably 10-15 wt. % versus the total weight of the second component.

According to some embodiments, the second component comprises a photo-latent base catalyst. In certain embodiments, the photo-latent catalyst promotes the isocyanate-alcohol reaction that is only activated after exposure to UV light. The term photo-latent base as used herein refers to a molecule that changes structure in response to UV light to become a new molecule with a larger $pK_a$ (logarithmic acid dissociation constant). The second component comprises the photo-latent catalyst in any of a variety of suitable amounts. For example, in some embodiments, the second component comprises the photo-latent catalyst in an amount of 0.01-2.5 wt. % based on the total weight of the second component.

In certain embodiments, the second component comprises additional components. The additional components may add capabilities and/or assist in easier fabrication and increasing productivity, according to some embodiments.

According to certain embodiments, the second component comprises a chain extender (e.g., a hydroxyl chain extender). The chain extender may be a mono-functional, bi-functional, or tri-functional chain extender. In certain embodiments, the chain extender comprises 1,4-butanediol, 2-ethyl-1,3-hexanediol, an alkoxylated polyol (e.g., Polyol 3990 provided by Perstorp), and/or trimethylol propane. The second component comprises the chain extender in any of a variety of suitable amounts. For example, in certain embodiments, the second component comprises the chain extender in an amount of 2-35 wt. % versus the second component. According to some embodiments, the chain extender may have any of a variety of suitable molecular weights. For example, in some embodiments, the chain extender (e.g., a bi-functional chain extender) has a molecular weight of greater than or equal to 90 g/mol and less than or equal to 150 g/mol. In certain embodiments, the chain extender (e.g., a tri-functional chain extender) has a molecular weight of greater than or equal to 100 g/mol and less than or equal to 200 g/mol). In certain embodiments, the chain extender is used to react with the reactive sites on isocyanate in order to increase the stiffness of the ink formulation.

In some embodiments, the second component comprises a thermoplastic additive. In certain aspects, the thermoplastic additive is a phenoxy resin (e.g., PKHP-200 from Gabriel Performance Products). In some embodiments, the thermoplastic additive is a thermoplastic copolymer of bisphenol A and epichlorohydrin. According to certain embodiments, the thermoplastic additive is optional. The second component may comprise the thermoplastic additive in any of a variety of suitable amounts. For example, in some embodiments, the second component comprises the thermoplastic additive in an amount of 0-10 wt. % versus the total weight of the second component. According to certain embodiments, the thermoplastic additive is physically dispersed in or chemically bound to the polyurethane elastomer matrix.

In some embodiments, the second component comprises an organometallic catalyst. For example, in certain embodiments, the organometallic catalyst is zinc-bismuth. The second component may comprise the organometallic catalyst in any suitable amount. For example, in some embodiments, the second component comprises the thermoplastic additive in an amount of 0.05-5 wt. % versus the total weight of the-second component. According to some embodiments, the organometallic catalyst promotes the reaction of a cyanate group (—N=C=O) group of the isocyanate with a hydroxyl group (—OH) of one or more polyols.

In some embodiments, the second component comprises a pigment. For example, in certain embodiments, the pigment is 6836 Black Pigment from BJB Enterprises. According to some embodiments, the pigment adds color to the hybrid ink formulation. In certain embodiments, the pigment is optional. The second component may comprise the pigment in any of a variety of suitable amounts. For example, in some embodiments, the second component comprises the pigment in an amount of 0.3-1.8 wt. % versus the total weight of the second component.

In some embodiments, the second component comprises an antioxidant. The second component may comprise the antioxidant in any of a variety of suitable amounts. For example, in some embodiments, the second component comprises the antioxidant in an amount of 1-5 wt. % versus the total weight of the second component. According to certain embodiments, the antioxidant prevents oxidation of the hybrid ink formulation.

In some embodiments, the second component comprises a UV absorber. The second component may comprise the UV absorber in any of a variety of suitable amounts. For example, in certain embodiments, the second component comprises the UV absorbed in an amount of 1-5 wt. % versus the total weight of the second component. According to certain embodiments, the UV absorber helps prevent UV degradation of polyurethane.

In some embodiments, the second component comprises a UV stabilizer. The second component may comprise the UV stabilizer in any of a variety of suitable amounts. For example, in certain embodiments, the second component comprises the UV stabilizer in an amount of 1-5 wt. % versus the total weight of the second component. According to certain embodiments, the UV stabilizer helps prevent UV degradation of polyurethane.

In certain embodiments, the second component comprises a flexiblizing component (e.g., hydroxyl terminated polybutadiene such as Krasol LBH-P 2000 from Total Cray Valley). In some embodiments, the flexibilizing component is optional. The second component may comprise the flexibilizing component in any of a variety of suitable amounts. For example, in some aspects, the second component comprises the flexibilizing component in an amount of 0-20 wt. % versus the total weight of the composition.

According to some embodiments, the second component comprises a moisture scavenger. For example, in some embodiments, the moisture scavenger comprises molecular sieves (e.g., 3 A molecular sieve powder). In certain embodiments, the moisture scavenger is optional. The second component may comprise the moisture scavenger in any of a variety of suitable amounts. For example, in certain embodiments, the second component comprises the moisture scavenger in an amount of 0-10 wt. % versus the total weight of the second component.

In certain embodiments, the second component comprises a surface modification additive. For example, the surface modification additive may be molecular sieves (e.g., Expancel 920 DU 40 from AskoNobel). The second component may comprise the surface modification additive in any of a variety of suitable amounts. For example, in some embodiments, the second component comprises the surface modification additive in an amount of 0.1-2 wt. % versus the total weight of the second component. According to certain embodiments, when the surface modification additive is exposed to a certain temperature, the surface modification additive will expand and modify the surface appearance (e.g., create a matte finish from an original glossy finish). In certain embodiments, the surface modification additive selectively and/or locally modifies surface appearance that could be desirable for certain applications (e.g. fashion apparel).

In some embodiments, the second component comprises a thermally activated free radical generator. In certain embodiments, the thermally activated radical generator is a peroxide. In certain cases, for example, the peroxide is benzyl peroxide. According to certain embodiments, the thermally activated radical generator is an azo-containing compound. For example, in some aspects, the azo-containing compound is azobisisobutyronitrile. The second component may comprise the thermally activated free radical generator in any of a variety of suitable amounts. For example, in some embodiments, the second component comprises the thermally activated free radical generator in an amount of 0-20 wt. %. In certain embodiments, the thermally activated free radical generator produces free radicals that may initiator polymerization.

According to certain embodiments, the second component comprises a rheology additive. For examples, in certain embodiments, the rheology additive is a liquid rheology additive (e.g., BYK D-410), fumed silica, spherical silica, amide wax, glass beads (e.g., reflective glass beads), and/or thermoplastic microspheres (e.g., Expancel microspheres provided by AkzoNovbel). In some embodiments, the rheology additive is optional. In certain embodiments, the rheology additive may be dispersed in a resin. According to some embodiments, the rheology additive may transform from a high viscosity liquid to a paste-like material over a period of several hours. The time dependence facilitates more efficient syringe filling and minimizes the chances of air trapping. The second component may comprise the rheology additive in any suitable amount. For example, in some embodiments, the second component comprises the rheology additive in an amount of 0-10 wt. % versus the total weight of the second component.

In some embodiments, the second component may comprise reactive liquid polymers (e.g., Hypro 1300X21 ATBN from CVC Thermoset Specialties).

According to certain embodiments the hybrid ink formulation may comprise the second component in any suitable amount. For example, the hybrid ink formulation may comprise 25-70 wt. % of the second component versus the total weight of the ink formulation.

In certain embodiments, the ink formulation comprises mixing (e.g., in a mixing chamber) the first component comprising molecules with one or more isocyanate functional groups and the second component comprising molecules with one or more alcohol functional groups and/or one or more of amine functional groups. According to certain embodiments, at least a portion of the first component can react with at least a portion of the second component. In some embodiments, the formulation comprises molecules that have a UV-curable functional group, and molecules that have a functional group curable by means other than UV exposure. For example, in certain embodiments, upon exiting the mixing chamber (e.g., through a printing nozzle), a portion of the hybrid ink formulation is exposed to UV irradiation and cured by UV irradiation directly as it exits the mixing chamber and/or a portion of the hybrid ink formulation is thermally cured (e.g., at room temperature and/or in the presence of heating) after exiting the mixing chamber. According to certain embodiments, the hybrid ink formulation is dual cured.

According to some embodiments, the ink formulation can be fine-tuned such that the final characteristics and properties of the formulation can be changed at any given time without need or necessity of changing any of the individual parts. For example, combining a printing nozzle (e.g., having a mixing chamber and an impeller disposed in the mixing chamber) configured to actively mix small volumes of material with a compressed gas source, an outlet of which the printing nozzle intersects with an outlet in fluid communication with the compressed gas source, a print head with spraying capabilities results in which ratios (e.g., volume ratios) input into the printing nozzle, and therefore the material composition of the sprayed material, can be changed on the fly.

In certain embodiments, the first component and the second component are fully separated prior to mixing. In some embodiments, the components of the second component is fully separated prior to mixing. For example, in some embodiments, the mixing chamber has multiple inputs (e.g., two, three, four, five, ten), and a range of formulations can be generated using the first component and certain components of the second component, as necessary. According to some embodiments, the first component and the second component enter the mixing chamber through the multiple inputs and the ratios of the first component and/or second component can be changed to vary the composition of the formulation.

According to certain embodiments, at least one input contains at least one molecule with one or more isocyanate functional groups and at least one input contains at least one molecule with one or more alcohol functional groups and/or one or more molecules with one or more amine functional groups. In some embodiments, at least one input contains at least one molecule with one or more isocyanate functional groups and three inputs contain at least one molecule with one or more alcohol functional groups and/or one or more molecules with one or more amine functional groups. According to some embodiments, the at least one molecule with one or more isocyanate functional groups comprises methylene diphenyl diisocyanate and the at least one molecule with one or more alcohol functional groups and/or one or more molecules with one or more amine functional groups comprises polytetramethylene ether glycol, polycarbonate, polycaprolactone, and/or polyetheramine.

In certain embodiments, premature curing in the mixing chamber can be controlled by the use of isocyanate with blocking agents. For example, in certain embodiments, the use of blocked isocyanates can help to widen the processing window since the ink formulation will not cure until the blocked agent has been inactivated (e.g., by exposure to high temperatures).

In certain embodiments, silane based adhesion promotors (e.g., Dynasylan DS 6490 from Evonik) can be incorporated into the hybrid ink formulation to provide improved adhesion to a variety of substrates. In some embodiments, silane terminated polyurethane can be incorporated into the hybrid ink formulation where use of traditional isocyanate based polyurethanes could be a concern.

The combination of the first component and the second component yields an ink formulation which can be an elastomer(s) or foam(s) with a broader set of mechanical properties (e.g., stiffness or tensile modulus, elastic modulus, shore hardness, percent elongation at break) than possible with either the first component or the second component alone. Furthermore, according to certain embodiments, one or more of the mechanical properties (e.g., stiffness or tensile modulus, elastic modulus, shore hardness, percent elongation at break) does not vary by more than 25% after curing (e.g., between 50° C. and 130° C.), regardless of whether the formulation is exposed to UV irradiation.

For example, in certain embodiments, the stiffness (e.g., tensile modulus) of the ink formulation that can be an elastomer(s) or foam(s) can vary over 10 orders of magnitude (e.g., from 2 MPa to greater than 1000 MPa).

According to some embodiments, the elastic modulus of the ink formulation can vary from greater than or equal to 300 MPa to less than or equal to 4000 MPa.

In some embodiments, the hardness (shore hardness) of the ink formulation can vary from a minimal hardness (e.g., 50-70 Shore 00), to a medium hardness (e.g., 50-75 Shore A), to an extra hardness (e.g., 70-75 Shore D). In certain embodiments, the hardness of the ink formulation is between 50 Shore A to 75 Shore D. According to certain embodiments, the hardness can be measured by a Shore hardness probe.

According to certain embodiments, the percent elongation at break of the ink formulation can be changed as much as 4-5 times (e.g., can vary from 150% to greater than 700%).

For certain design application, the clarity of a formulation that is deposited on a substrate (e.g., a porous fabric) is a critical aspect that defines the aesthetics of the substrate. It is often desirable to have the underlying substrate design to show through the deposited formulation. Accordingly, a substantially high or adequate clarity that allows for the underlying substrate to show through should not decrease mechanical properties of the formulation, including the stiffness, hardness, and flexibility. As explained herein, in some embodiments, certain polyols (e.g., polycarbonate) impart stiffness and hardness, while other polyols (e.g., polytetramethylene ether glycol) impart flexibility and dynamic performance. In certain embodiments, a combination of polycarbonate and polytetramethylene ether glycol is used to achieve a suitable range of mechanical properties, such as stiffness and flexibility.

In some embodiments, certain initiators have a significant impact on miscibility of the first and second component, and therefore also affect the clarity of the formulation when the formulation is deposited on a substrate. In certain embodiments, a hexanediol initiated polycarbonate diol (e.g., Eternacoll PH-100), when mixed with polytetramethylene ether glycol, forms an immiscible material, translating to an opaque to milky white appearance when cured (e.g., with a MDI-based isocyanate). In certain embodiments, a butyl ethyl propanediol initiated polycarbonate diol (e.g., Oxymer M112) forms a clear and miscible material with polytetramethylene ether glycol and when cured (e.g., with a MDI-based isocyanate). In some embodiments, a chain extender (e.g., 1,4-butanediol, 2-ethyl-1,3-hexanediol) may also affect the clarity of the formulation.

In certain embodiments, the clarity of the ink formulation (e.g., in a cured state) may be analyzed by measuring a haze value. For example, the haze value of the ink formulation may be less than or equal to 30%, less than or equal to 20%, less than or equal to 10%, of less than or equal to 5%. In some embodiment, the clarity of the ink formulation is greater than or equal to 1%. The haze value may be determined, in some cases, using UV-visible spectroscopy.

In some embodiments, it can be useful to deposit the formulation onto surfaces by spraying rather than by extrusion alone through a nozzle. Advantages of spraying relative to extrusion alone may include but are not limited to deposition of thinner films with no extrusion lines; reduced sensitivity to nozzle standoff distance from the substrate; and/or a capacity to create wider strips of material in one pass to reduce cycle time. Other advantages of spraying relative to extrusion alone may include limited accumulation or no accumulation of cured material on the nozzle, which may be because spraying may not require the spray nozzle to come into direct fluid communication with material that has already been deposited. In addition, coatings made by spraying can be applied in a conformal manner to three-dimensional (3D) surfaces without precise alignment or 3D tool-pathing.

In some embodiments, it is possible to make slight modifications to a mixing nozzle (e.g., a 4-input dynamic mixing nozzle) to convert it into a spray nozzle. In order to do this, a compressed gas guiding sheath fluidly connected with a compressed gas source may be attached around the outside of the nozzle. In some embodiments, a configuration of an impeller disposed in the mixing chamber of the mixing nozzle ensures that a small mixing volume is retained such that rapid changes in the sprayed material composition can be executed. According to certain embodiments, the print head is configured to atomize the formulation into a spray. For example, in some embodiments, the compressed gas guiding sheath (e.g., air guiding sheath) is configured to guide the flow of compressed gas from a compressed gas source to atomize the output of the nozzle into small droplets immediately upon exiting the nozzle. In some embodiments, the small droplets are then propelled through the air to land on a target substrate. In some embodiments, ratio(s) (e.g., volume ratios) of the inputs (e.g., 4 inputs) into the mixing chamber can be changed in space and time to vary the composition of the material that is sprayed. In some embodiments, the geometry of the compressed gas guiding sheath and/or the applied pressure from the compressed gas can be used to change the shape and velocity of the cone of atomized material that is deposited. In some embodiments, the standoff distance from the substrate can be used to control the width of the sprayed strips.

A potential limitation of spraying (e.g., spraying a mixture of chemically reactive materials) may be that depending on the applied pressure from the compressed gas through the compressed gas guiding sheath, the sprayed films that are deposited onto the substrate can be deformed after deposition by the force of the compressed gas blowing against them. In embodiments where spraying a mixture of chemically reactive materials occurs, one solution to this problem may be to induce the mixture of materials to react more quickly and become solid very quickly so that the mixture can withstand the forces of the compressed gas without permanent deformation. However, this solution may create risks of accumulating cured material inside of a mixing nozzle (e.g., inside of a mixing chamber) during deposition. Another solution may be to add a UV-curable component to one or more inputs that are mixed together in the mixing chamber. As a non-limiting example, free radical polymerization between materials with alkene functional groups (e.g., acrylates, methacrylates, vinyls) may proceed very rapidly (e.g., in fractions of a second) when exposed to high power UV irradiation, but may also remain stable for months when not exposed to UV irradiation. After adding a UV-curable component to the mixture, the mixture can be exposed to UV irradiation directly as it exits the mixing chamber. The exposure to UV irradiation may increase the viscosity of the resulting material very rapidly to the consistency of a non-flowing paste or gel that can withstand forces from the compressed gas without deformation. For example, in certain embodiments, exposure to UV irradiation causes the viscosity of the formulation to increase by at least a factor of 2. This rapid increase in viscosity may also prevent the deposited material from soaking into porous fabrics, and may enable structures of substantial thickness to be built up. Since the UV-curable components of the system may represent only a fraction of the total functional groups that have the capability of reacting to form a solid polymer, the deposited material may continue to increase in viscosity, and also may form chemical bonds with previously deposited material as functional groups in the mixed material (e.g., isocyanates and one or more of alcohol groups or amine groups) curable by means other than UV exposure continue to react with one another after the UV irradiation (e.g., high power UV irradiation) is removed. Additionally, in certain aspects, exposure to UV irradiation causes the dynamic yield and/or static yield of the formulation to increase by at least a factor of 2.

In some cases, a UV-curable component of the mixture may be a urethane acrylate that does not have any alcohol or isocyanate groups present on it. In some cases, UV-curable component(s) of the mixture may be present within the same molecule that also has one or more functional groups curable by means other than UV exposure (e.g., alcohol, amine, or isocyanate groups). The mass percentage of molecules that contain UV-curable functionality may be as high as 100% for any individual input. The mass percentage of molecules that contain UV-curable functionality may be as high as 60% for the final mixture in the case that molecules containing UV-curable functional groups are present on different molecules from the molecules containing one or more functional groups curable by means other than UV exposure (e.g., isocyanates, alcohols, or amines). In the case where UV-curable functional groups are present on the same molecules that also contain one or more functional groups curable by means other than UV exposure (e.g., isocyanates, alcohols, or amines), as much as 100% of the molecules may contain at least one UV-curable functional group. In the case that a hybrid UV-curable mixture is used, wherein UV-curable functional groups are present as well as one or more functional groups curable by means other than UV exposure, an irradiation source (e.g., a UV irradiation source, a light source, a UV light source) may be integrated into (or adjacent to) the print head, such that the hybrid UV-curable mixture may be UV cured immediately upon exiting the nozzle. The irradiation source (e.g., UV irradiation source) may comprise one or more UV LEDs, each with a peak wavelength between or equal to 200 nm and 405 nm. The irradiation source (e.g., UV irradiation source) may also comprise mercury lamps or bulbs. The irradiation source may also comprise a light source with a peak wavelength outside of the UV spectrum, provided that the intensity of irradiation in the UV spectrum is sufficiently high to activate a photoinitiator in the system. Additionally, the irradiation source may be one or more DLP (Digital Light Projection) projectors. The projectors may have lenses that direct the light (e.g., focus the light) onto a small region, but enable the light in that region to be patterned. The projectors can be used to change the shape of an image that is projected so that the light is directed only onto regions that require exposure.

Other variations of a nozzle include but are not limited to: a spray nozzle with a compressed gas source and/or a compressed gas guiding sheath without an irradiation source (e.g., without a UV light source) with at least two inlets to the nozzle, for depositing a reactive system having two or more parts without any UV-curable components; or a nozzle with two inlets and (in some cases without a compressed gas source or guiding sheath but) including an irradiation source (e.g., a UV irradiation source), for depositing by extrusion (in some cases without spray functionality) a reactive system having two or more parts with some irradiation-curable (e.g., UV-curable) components.

In the certain embodiments that the hybrid ink formulation is used, wherein UV-curable functional groups are present as well as one or more functional groups curable by means other than UV exposure, an irradiation source (e.g., a UV irradiation source, a light source, a UV light source) may be integrated into (or adjacent to) the print head, such that the hybrid UV-curable mixture may be UV cured immediately upon exiting the nozzle. The irradiation source (e.g., UV irradiation source) may comprise one or more UV LEDs, each with a peak wavelength between or equal to 200 nm and 405 nm. The irradiation source (e.g., UV irradiation source) may also comprise mercury lamps or bulbs. The irradiation source may also comprise a light source with a peak wavelength outside of the UV spectrum, provided that the intensity of irradiation in the UV spectrum is sufficiently high to activate a photoinitiator in the system. Additionally, the irradiation source may be one or more DLP (Digital Light Projection) projectors. The projectors may have lenses that direct the light (e.g., focus the light) onto a small region, but enable the light in that region to be patterned. The projectors can be used to change the shape of an image that is projected so that the light is directed only onto regions that require exposure.

In some cases, it may be advantageous for the hybrid UV-curable mixture to experience a delay between exiting the nozzle and initial exposure to the irradiation source (e.g., UV irradiation source). This delay may allow the deposited material to level and spread, and/or to soak into the surface of the substrate (e.g., the fabric surface) to some degree before the viscosity of the extruded material increases substantially. This leveling, spreading, and/or soaking in can produce more uniform and flat films deposited with this method, relative to immediate exposure of the mixture to the irradiation source as it leaves the nozzle. In other cases, it may be advantageous to have no delay in exposure of the mixture to the irradiation source as it leaves the nozzle, such that the material that is deposited holds its shape without spreading or leveling. In some cases, a region surrounding the nozzle tip may be exposed to irradiation (e.g., UV irradiation) continuously, and the rate of increase of viscosity of the mixture may be controlled by the mass fraction or volume fraction of UV-curable material present in the mixture, which can be controlled zonally by varying the ratios of two or more inputs into the mixing chamber.

In some embodiments, a print head is provided. The print head may comprise a printing nozzle, which can have a mixing chamber, an impeller disposed in the mixing chamber, and two or more material inlets in fluid communication with the mixing chamber. In some embodiments, a tip of the impeller is less than 5 mm from an outlet of the printing nozzle. In some embodiments, an outlet of the printing nozzle (e.g., of the mixing chamber) is configured to intersect with an outlet fluidly connected to the compressed gas source (see, e.g., FIG. 2). In some embodiments, a volume of the mixing chamber is less than 1 mL. In some embodiments, the volume of the mixing chamber is less than 250 microliters. In some embodiments, the mixing chamber is in fluid communication with three or more material inlets. In some embodiments, the mixing chamber is in fluid communication with four or more material inlets. In some embodiments, one or more of the material inlets is in fluid communication with a respective in-line rotary pump.

Figure 1:
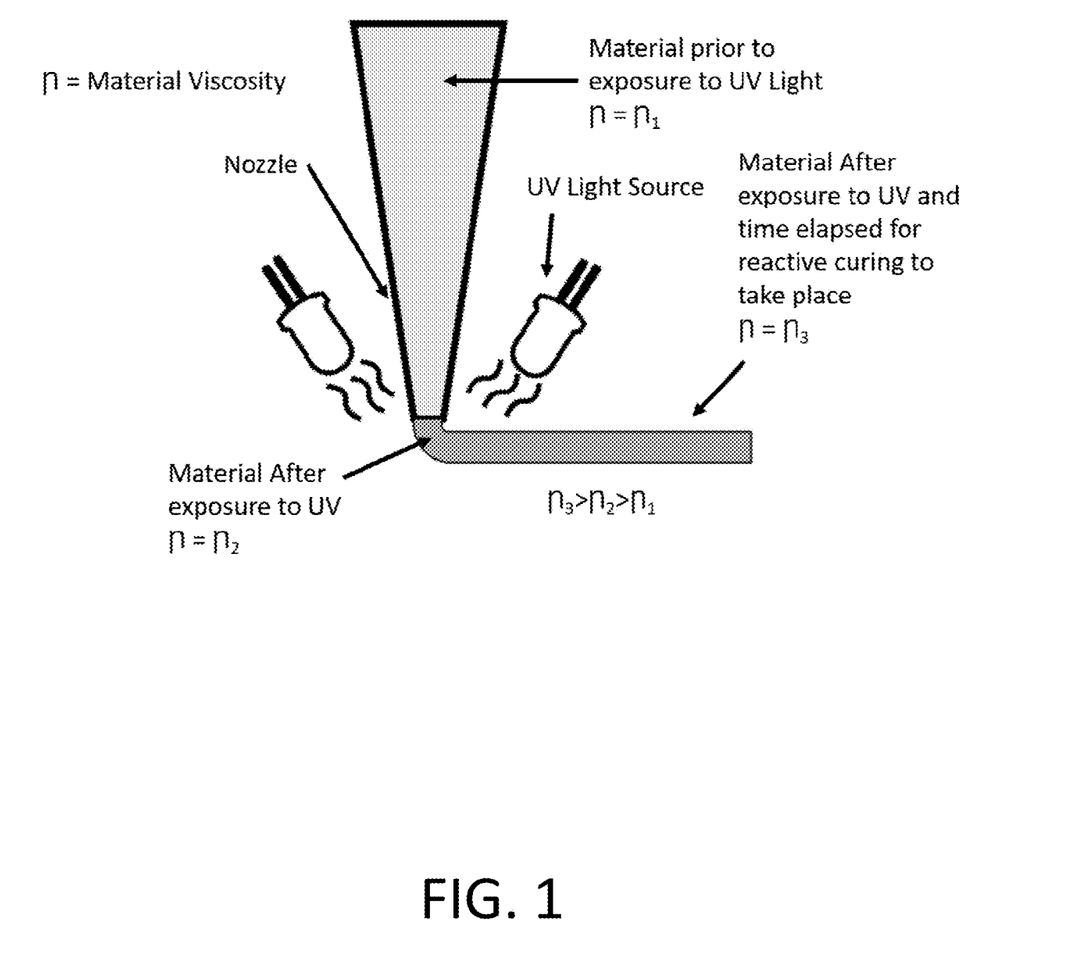
FIG. 1 shows, according to certain embodiments, a schematic of an illustrative print head with an integrated UV curing mechanism.
Figure 2:
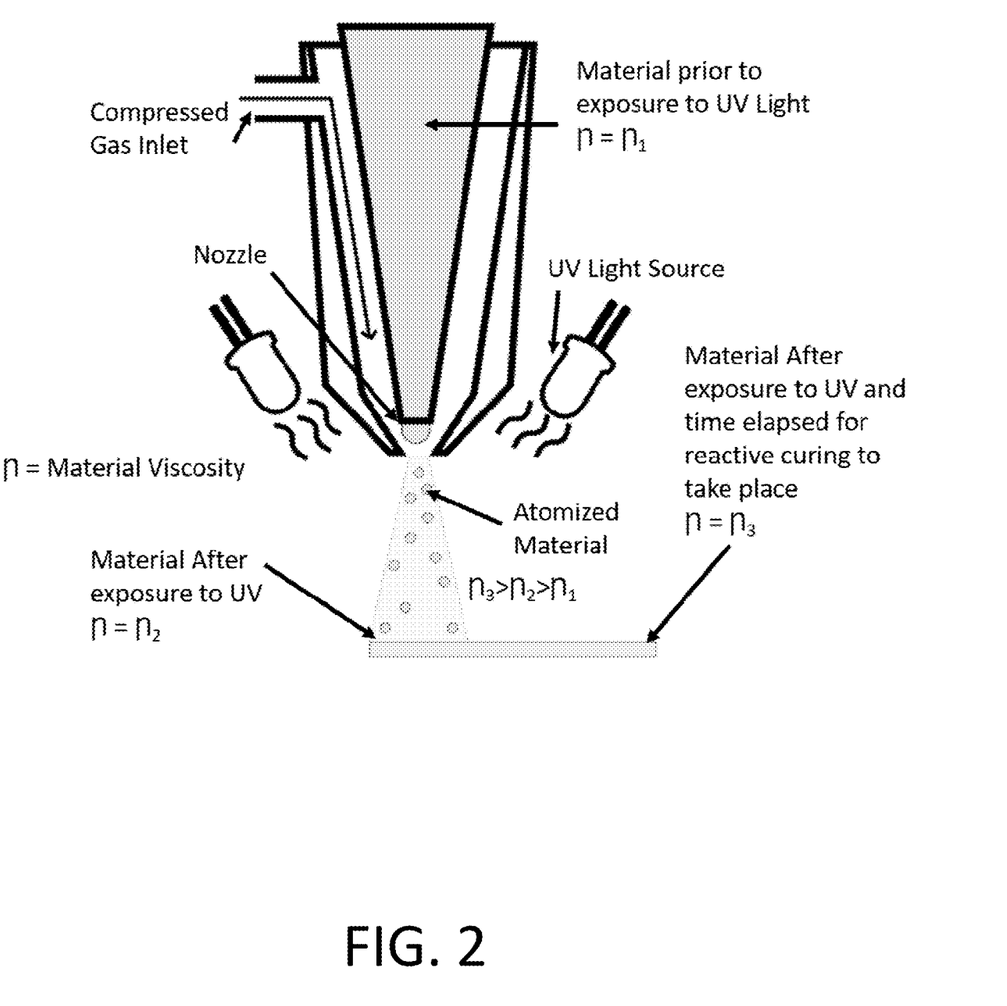
FIG. 2 shows, according to certain embodiments, a schematic of an illustrative spray print head with an integrated UV curing mechanism.

The print head can have a light source (e.g., an ultraviolet (UV) light source) adjacent to the printing nozzle (see, e.g., FIG. 1 and FIG. 2). In some embodiments, the light source (e.g., UV light source) comprises an emission wavelength between or equal to 200 nm and 405 nm. In some embodiments, the light source (e.g., UV light source) is configured to irradiate a material directly as the material exits the printing nozzle (e.g., exits the mixing chamber). In some embodiments, the light source (e.g., UV light source) is configured to irradiate a material after the material exits the mixing chamber with a predetermined delay. In some embodiments, the light source (e.g., UV light source) comprises an emission wavelength between or equal to 200 nm and 405 nm. In some embodiments, the light source (e.g., UV light source) comprises one or more light emitting diodes (LEDs) (e.g., UV LEDs). In some embodiments, the light source (e.g., UV light source) is one or more Digital Light Projectors (DLP).

The print head can have a compressed gas source (see, e.g., FIG. 2). In some embodiments, the compressed gas source is configured to atomize a material extruded from the printing nozzle (e.g., from the mixing chamber). In some embodiments, the compressed gas source is in fluid communication with an electropneumatic regulator. In some embodiments, the print head has a compressed gas guiding sheath fluidly connected to the compressed gas source (see, e.g., FIG. 2). In some embodiments, an outlet of the mixing chamber is configured to intersect with an outlet of the compressed gas guiding sheath. In some embodiments, the compressed gas guiding sheath is a microfluidic gas guiding sheath. In some embodiments, the compressed gas guiding sheath (e.g., microfluidic gas guiding sheath) is actuatable such the sheath can be moved with respect to an outlet of the printing nozzle or vice versa. In some embodiments, the compressed gas guiding sheath (e.g., microfluidic gas guiding sheath) is coupled to the print head through magnetic attachment such that it can be easily removed. In some embodiments, the compressed gas guiding sheath (e.g., microfluidic gas guiding sheath) has multiple gas channels coupled to valves that can be addressed individually. In some embodiments, moving the sheath with respect to the outlet of the printing nozzle changes channels through which compressed gas is configured to flow, which changes the shape of an atomized material cone that is deposited onto the surface from the outlet of the printing nozzle.

The method may comprise passing a formulation through a print head. In some embodiments, the method comprises mixing two or more parts of the formulation in a printing nozzle of the print head to form a mixture. In some embodiments, the method comprises exposing the formulation to light (e.g., UV light) for e.g., between or equal to 0.01 seconds and 10 seconds, or between or equal to 1 seconds and 3 seconds. In some embodiments, the method comprises exposing the formulation (e.g., mixture) to light at a wavelength within the absorption spectrum of the photoinitiator for e.g., between or equal to 0.01 seconds and 10 seconds, or between or equal to 1 seconds and 3 seconds. In some embodiments, the method comprises flowing compressed gas from the compressed gas source to atomize the formulation as it exits the nozzle. In some embodiments, the method comprises flowing compressed gas from the compressed gas source to atomize the formulation after it exits the nozzle with a predetermined delay. In some embodiments, the formulation comprises two or more parts, and passing a formulation through the print head involves flowing at least two of the two or more parts of the formulation through a respective material inlet of the two or more material inlets into the printing nozzle. In some embodiments, the formulation comprises three or more parts, and passing a formulation through the print head involves flowing at least three of the three or more parts of the formulation through a respective material inlet of three or more material inlets into the printing nozzle. In some embodiments, the formulation comprises four or more parts, and passing a formulation through the print head involves flowing at least four of the four or more parts of the formulation through a respective material inlet of four or more material inlets into the printing nozzle.

In some embodiments, the formulation comprises molecules that have a UV-curable functional group. In some embodiments, the formulation comprises molecules that have a functional group curable by means other than UV exposure. In some embodiments, the formulation comprises molecules that have a UV-curable functional group, and molecules that have a functional group curable by means other than UV exposure. In some embodiments, some of the molecules that have the UV-curable functional group also have a functional group curable by means other than UV exposure. In some embodiments, the formulation comprises molecules that have an isocyanate functional group. In some embodiments, the formulation comprises molecules that have one or more of an alcohol functional group or an amine functional group. In some embodiments, the formulation comprises molecules that have an alkene functional group and molecules that have one or more of an alcohol functional group, an amine functional group, or an isocyanate functional group. In some embodiments, the formulation (e.g., mixture) comprises alkene groups, isocyanate groups, a photoinitiator, and at least one of alcohol groups or amine groups.

In some embodiments, the method comprises mixing two or more parts of the formulation together to form a mixture that comprises alkene groups (e.g., acrylates, methacrylates, vinyls, etc.), isocyanate groups, a photoinitiator, and at least one of alcohol groups or amine groups. In some embodiments, the method comprises exposing the mixture to light (e.g., UV light) at a wavelength within the absorption spectrum of the photoinitiator (e.g., between or equal to 365 nm and 405 nm). In some such embodiments, the alkene groups in the mixture react with one another to increase the viscosity of the mixture.

The print head may comprise a compressed gas source, a printing nozzle, and/or two or more material inlets in fluid communication with the printing nozzle. In some embodiments, an outlet of the printing nozzle is configured to intersect with an outlet fluidly connected to the compressed gas source. In some embodiments, the print head comprises an ultraviolet (UV) light source adjacent to the printing nozzle. In some embodiments, the printing nozzle comprises a mixing chamber and an impeller disposed in the mixing chamber. In some embodiments, the two or more material inlets are in fluid communication with the mixing chamber.

In some embodiments, the mixture continues to increase in one or more of viscosity, strength, yield stress, or stiffness after UV exposure is finished as a result of reaction between molecules in the mixture that have a functional group curable by means other than UV exposure (e.g., between molecules in the mixture that have isocyanate groups and one or more of alcohol groups and amine groups). In some embodiments, the mixture does not have a yield stress when it reaches an outlet of the printing nozzle (e.g., outlet of the mixing chamber), prior to exposure to UV light. In some embodiments, the mixture develops a yield stress within 2 seconds after exposure to UV light.

According to certain embodiments, the hybrid ink formulation can be printed on structures on fabrics that can be converted into shoes or apparel. In some embodiments, the fabrics used for the production of shoes and apparel can be made of a variety of suitable materials (e.g., leather, textiles, foams, synthetics, etc.).

The following examples are intended to illustrate certain embodiments of the present invention, but do not exemplify the full scope of the invention.

Example 1

The following example describes a composition used in a hybrid ink formulation. A 4-part quad system with one input containing isocyanante functional groups (Table 1) and three inputs containing alcohol functional groups (Table 2) is described, wherein PTMEG is polytetramethylene ether glycol and PC is polycarbonate.

TABLE 1

First component comprising a blend of methylene diphenyl diisocyanate (MDI) prepolymer made with polyether polyols with a combined % NCO of 19%.

| Component | % NCO of prepolymer | Wt. % Range |
|---|---|---|
| MDI prepolymer based on polyether polyol | >19.0 | 60-90 |
| MDI prepolymer based on specialty polyether (e.g., PTMEG) polyol | <11.0 | 5-20 |
| MDI prepolymer based on specialty polyether (e.g., PTMEG) polyol | >16.0 | 2-15 |
| Rheology Additive (e.g., fumed silica) | — | 0-10 |

TABLE 2

Second component comprising different combinations of polyether, polyester polyols, and a hydroxyl chain extender.

| Component | Wt. % Range |
|---|---|
| Specialty polyether polyol (e.g., PTMEG, MW > 650 g/mol) | 20-40 |
| Premium polyester polyol (e.g., PC, MW > 500 g/mol | 30-55 |
| Hydroxyl chain extender (e.g., 1,4-butanediol) | 2-25 |
| Moisture scavenger (e.g., MolSiv 3A powder) | 0-10 |
| UV additives (e.g., light stabilizers, UV absorbers, anti-oxidants) | 1-5 |
| Organometallic catalyst (e.g., zinc-bismuth) | 0.05-5 |
| Rheology additive (e.g., fumed silica) | 0-10 |

Example 2

The following example describes a composition used in a hybrid ink formulation. A 4-part quad system with one input containing isocyanante functional groups (Table 3) and three inputs containing alcohol functional groups (Table 4) is described, wherein the hybrid ink formulation provides good cold flex performance and wherein PCL is polycaprolactone.

TABLE 3

First component comprising a blend of methylene diphenyl diisocyanate (MDI) prepolymer made with polyether polyols with a combined % NCO of 19%.

| Component | % NCO of prepolymer | Wt. % Range |
|---|---|---|
| MDI prepolymer based on polyether polyol | >19.0 | 30-65 |
| MDI prepolymer based on specialty polyether (e.g., PTMEG) polyol | <11.0 | 35-55 |
| MDI prepolymer based on specialty polyether (e.g., PTMEG) polyol | >16.0 | 0-10 |
| Rheology Additive (e.g., fumed silica) | — | 0-10 |

TABLE 4

Second component comprising different combinations of polyether, polyester polyols, a hydroxyl chain extender, and an amine functional group containing molecule.

| Component | Wt. % Range |
|---|---|
| Specialty polyether polyol (e.g., PTMEG, MW > 650 g/mol) | 0-30 |
| High performance polyester polyol (e.g., PCL, MW > 500 g/mol | 30-60 |
| Hydroxyl chain extender (e.g., 1,4-butanediol) | 2-35 |
| Amine functional component (e.g., polyetheramine) | 0-7 |
| Flexibilizing component (e.g., hydroxyl terminated polybutadiene) | 0-20 |
| Moisture scavenger (e.g., MolSiv 3A powder) | 0-10 |
| UV additives (e.g., light stabilizers, UV absorbers, anti-oxidants) | 1-5 |
| Organometallic catalyst (e.g., zinc-bismuth) | 0.05-5 |
| Rheology additive (e.g., fumed silica) | 0-10 |

Example 3

The following example describes a composition used in a hybrid ink formulation. A 4-part quad system with one input containing isocyanante functional groups (Table 5) and three inputs containing alcohol functional groups (Table 6) is described.

TABLE 5

First component comprising a blend of methylene diphenyl diisocyanate (MDI) prepolymer made with polyether polyols with a combined % NCO of 19%.

| Component | % NCO of prepolymer | Wt. % Range |
|---|---|---|
| MDI prepolymer based on polyether polyol | >19.0 | 30-65 |
| MDI prepolymer based on specialty polyether (e.g., PTMEG) polyol | <11.0 | 35-55 |
| MDI prepolymer based on specialty polyether (e.g., PTMEG) polyol | >16.0 | 0-10 |
| Rheology Additive (e.g., BYK D-410) | — | 0-10 |

TABLE 6

Second component comprising different combinations of polyether, polyester polyols, a hydroxyl chain extender, and an amine functional group containing molecule.

| Component | Wt. % Range |
|---|---|
| Specialty polyether polyol (e.g., PTMEG, MW > 650 g/mol) | 20-40 |
| High performance polyester polyol (e.g., PCL, MW > 500 g/mol) | 30-60 |
| Hydroxyl chain extender (e.g., 1,4-butanediol) | 2-25 |
| Moisture scavenger (e.g., MolSiv 3A powder) | 0-10 |
| Amine functional component (e.g., polyetheramine) | 2-7 |
| UV additives (e.g., light stabilizers, UV absorbers, anti-oxidants) | 1-5 |
| Surface modification additive (e.g., Expancel 920 DU 40) | 0.1-2 |
| Organometallic catalyst (e.g., zinc-bismuth) | 0.05-5 |
| Rheology additive (e.g., BYK D-410) | 0-10 |
| Pigment (e.g., BJB 6836 Black) | 0-1.8 |

Example 4

The following example describes a composition used in a hybrid ink formulation. A 4-part quad system with one input containing isocyanante functional groups (Table 7) and three inputs containing alcohol functional groups (Table 8) is described.

TABLE 7

First component comprising a blend of methylene diphenyl diisocyanate (MDI) prepolymer made with polyether polyols with a combined % NCO of 19%.

| Component | % NCO of prepolymer | Wt. % Range |
|---|---|---|
| MDI prepolymer based on polyether polyol | >19.0 | 30-65 |
| MDI prepolymer based on specialty polyether (e.g., PTMEG) polyol | <11.0 | 35-55 |
| MDI prepolymer based on specialty polyether (e.g., PTMEG) polyol | >16.0 | 0-10 |
| Rheology Additive (e.g., fumed silica) | — | 0-10 |

TABLE 8

Second component comprising different combinations of polyether, polyester polyols, and a hydroxyl chain extender.

| Component | Wt. % Range |
|---|---|
| Specialty polyether polyol (e.g., PTMEG, MW > 650 g/mol) | 20-40 |
| High performance polyester polyol (e.g., PCL, MW > 500 g/mol) | 30-60 |
| Hydroxyl chain extender (e.g., 1,4-butanediol) | 2-25 |
| Moisture scavenger (e.g., MolSiv 3A powder) | 0-10 |
| UV additives (e.g., light stabilizers, UV absorbers, anti-oxidants) | 1-5 |
| Organometallic catalyst (e.g., zinc-bismuth) | 0.05-5 |
| Rheology additive (e.g., BYK D-410) | 0-10 |
| UV Cure Package (e.g., Sartomer CN 965 + 2-7% Speedcure XKM initiator) | 5-20 |
| Photo-latent catalyst | 0-2.5 |

Example 5

The following example describes a composition used in a hybrid ink formulation. A 4-part quad system with one input containing isocyanante functional groups (Table 9) and three inputs containing alcohol functional groups (Table 10-12) is described.

TABLE 9

First component comprising a blend of methylene diphenyl diisocyanate (MDI) prepolymer made with polyether polyols with a combined % NCO of 19%.

| Component | % NCO of prepolymer | Wt. % Range |
|---|---|---|
| MDI prepolymer based on polyether polyol | >19.0 | 30-65 |
| MDI prepolymer based on specialty polyether (e.g., PTMEG) polyol | <11.0 | 35-55 |
| MDI prepolymer based on specialty polyether (e.g., PTMEG) polyol | >16.0 | 0-10 |
| Rheology Additive (e.g., fumed silica) | — | 0-10 |

TABLE 10

Second component comprising different combinations of polyether, polyester polyols, and a hydroxyl chain extender.

| Component | Wt. % Range |
|---|---|
| Polypropylene glycol based polyether diol (MW > 500 g/mol) | 50-70 |
| Polypropylene glycol based polyether triol (MW > 1000 g/mol) | 10-30 |
| Hydroxyl chain extender (e.g., 1,4-butanediol) | 1-5 |
| Moisture scavenger (e.g., MolSiv 3A powder) | 0-10 |
| UV additives (e.g., light stabilizers, UV absorbers, anti-oxidants) | 1-5 |
| Organometallic catalyst (e.g., zinc-bismuth) | 0.05-5 |
| Rheology additive (e.g., BYK D-410) | 0-10 |

TABLE 11

Second component comprising different combinations of polyether, polyester polyols, and a hydroxyl chain extender.

| Component | Wt. % Range |
|---|---|
| Polypropylene glycol based polyether diol (MW > 500 g/mol) | 50-70 |
| Polypropylene glycol based polyether triol (MW > 1000 g/mol) | 10-30 |
| Hydroxyl chain extender (e.g., 1,4-butanediol) | 5-15 |
| Moisture scavenger (e.g., MolSiv 3A powder) | 0-10 |
| UV additives (e.g., light stabilizers, UV absorbers, anti-oxidants) | 1-5 |
| Organometallic catalyst (e.g., zinc-bismuth) | 0.05-5 |
| Rheology additive (e.g., BYK D-410) | 0-10 |

TABLE 12

Second component comprising different combinations of polyether, polyester polyols, and a hydroxyl chain extender.

| Component | Wt. % Range |
|---|---|
| Polypropylene glycol based polyether diol (MW > 500 g/mol) | 50-70 |
| Polypropylene glycol based polyether triol (MW > 1000 g/mol) | 5-15 |
| Hydroxyl chain extender (e.g., 1,4-butanediol) | 15-25 |
| Moisture scavenger (e.g., MolSiv 3A powder) | 0-10 |
| UV additives (e.g., light stabilizers, UV absorbers, anti-oxidants) | 1-5 |
| Organometallic catalyst (e.g., zinc-bismuth) | 0.05-5 |
| Rheology additive (e.g., BYK D-410) | 0-10 |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
 passing a formulation through a print head,
 extruding the formulation through a nozzle of the print head,
 exposing the formulation to UV irradiation as the formulation exits the nozzle to at least partially cure the formulation, wherein exposure to UV irradiation causes the viscosity of the formulation to increase by at least a factor of 2,
 flowing compressed gas from a compressed gas source to atomize the formulation as the formulation as, or after, the formulation exits the nozzle, and depositing the formulation on a substrate, wherein the formulation comprises a first component comprising one or more molecules with one or more isocyanate functional groups and a second component comprising one or more molecules with one or more alcohol functional groups and/or one or more molecules with one or more amine functional groups.

2. The method according to claim 1, wherein the second component is a mixture of one or more molecules with one or more alcohol functional groups and one or more molecules with one or more amine functional groups.

3. The method according to claim 1, wherein the second component comprises one or more additional components selected from the group consisting of a UV cure package, a photo-latent base catalyst, a chain extender, a thermoplastic additive, an organometallic catalyst, a pigment, an antioxidant, a UV absorber, a UV stabilizer, a flexibilizing component, a moisture scavenger, a surface modification additive, a thermally activated free radical generator, and a rheology additive.

4. The method according to claim 1, wherein the first component comprises one or more molecules selected from the group consisting of methylene diphenyl diisocyanate, 1,6-hexamethylene diisocyanate, 1-isocyanato-3-isocyanatomethyl-3,5,5-tyimethyl cyclohexane, and/or 4,4'-diisocyanato dicyclohexylmethane.

5. The method according to claim 1, wherein the first component comprises a prepolymer of one or more molecules selected from the group consisting of methylene diphenyl diisocyanate, 1,6-hexamethylene diisocyanate, 1-isocyanato-3-isocyanatomethyl-3,5,5-tyimethyl cyclohexane, and/or 4,4'-diisocyanato dicyclohexylmethane.

* * * * *